US012677026B2

(12) United States Patent
    Zlygin

(10) Patent No.:  US 12,677,026 B2
(45) Date of Patent:      Jul. 7, 2026

(54) SYSTEMS AND METHODS FOR DETECTING AND CORRECTING AUDIO AND VIDEO SYNCHRONIZATION ISSUES

(71) Applicant: RingCentral, Inc., Belmont, CA (US)

(72) Inventor: Dmitrii Zlygin, Milton (CA)

(73) Assignee: RingCentral, Inc., Belmont, CA (US)

( * ) Notice:   Subject to any disclaimer, the term of this patent is extended or adjusted under 35 U.S.C. 154(b) by 74 days.

(21) Appl. No.: 18/757,965

(22) Filed:   Jun. 28, 2024

(65) Prior Publication Data

US 2026/0006283 A1   Jan. 1, 2026

(51) Int. Cl.
*H04N 21/43*      (2011.01)
*H04N 21/2662*     (2011.01)

(52) U.S. Cl.
CPC ... *H04N 21/43074* (2020.08); *H04N 21/2662* (2013.01)

(58) Field of Classification Search
CPC ..................... H04N 21/43074; H04N 21/2662
See application file for complete search history.

(56)          References Cited

U.S. PATENT DOCUMENTS

| | | | |
|---|---|---|---|
| 2001/0023436 A1* | 9/2001 | Srinivasan | ........... H04N 21/435 |
| | | | 375/E7.008 |
| 2008/0079851 A1 | 4/2008 | Stanger et al. | |
| 2013/0141643 A1* | 6/2013 | Carson | ............. H04N 21/43072 |
| | | | 348/515 |
| 2017/0251040 A1* | 8/2017 | Archambault | ..... H04N 21/4305 |
| 2019/0244639 A1* | 8/2019 | Benedetto | .............. G11B 27/11 |
| 2020/0322671 A1* | 10/2020 | Haslauer | ................ G06F 16/27 |
| 2024/0292051 A1* | 8/2024 | Matsumoto | ........ H04N 21/2368 |

* cited by examiner

*Primary Examiner* — Nicholas T Corbo
(74) *Attorney, Agent, or Firm* — Ansari Katiraei LLP; Arman Katiraei; Sadiq Ansari

(57)          ABSTRACT

A communication device and associated systems and methods accurately measure amounts by which audio and video playback for a communication become unsynchronized and automatically synchronized the playback based on the measurements. The communication device receives a video stream and an audio stream of the communication with a synchronization signal. The communication device decodes video frames and a unique frame identifier for each video frame from the video stream, an decodes an audio signal from the audio stream. The communication device detects the unique frame identifier of a particular video frame that is played back at a same time at which the audio signal satisfies a threshold, and measures a synchronization offset between the audio and video playback based on a difference between the unique frame identifier of the particular video frame and the unique frame identifier of a different video frame that is identified in the synchronization signal.

20 Claims, 7 Drawing Sheets

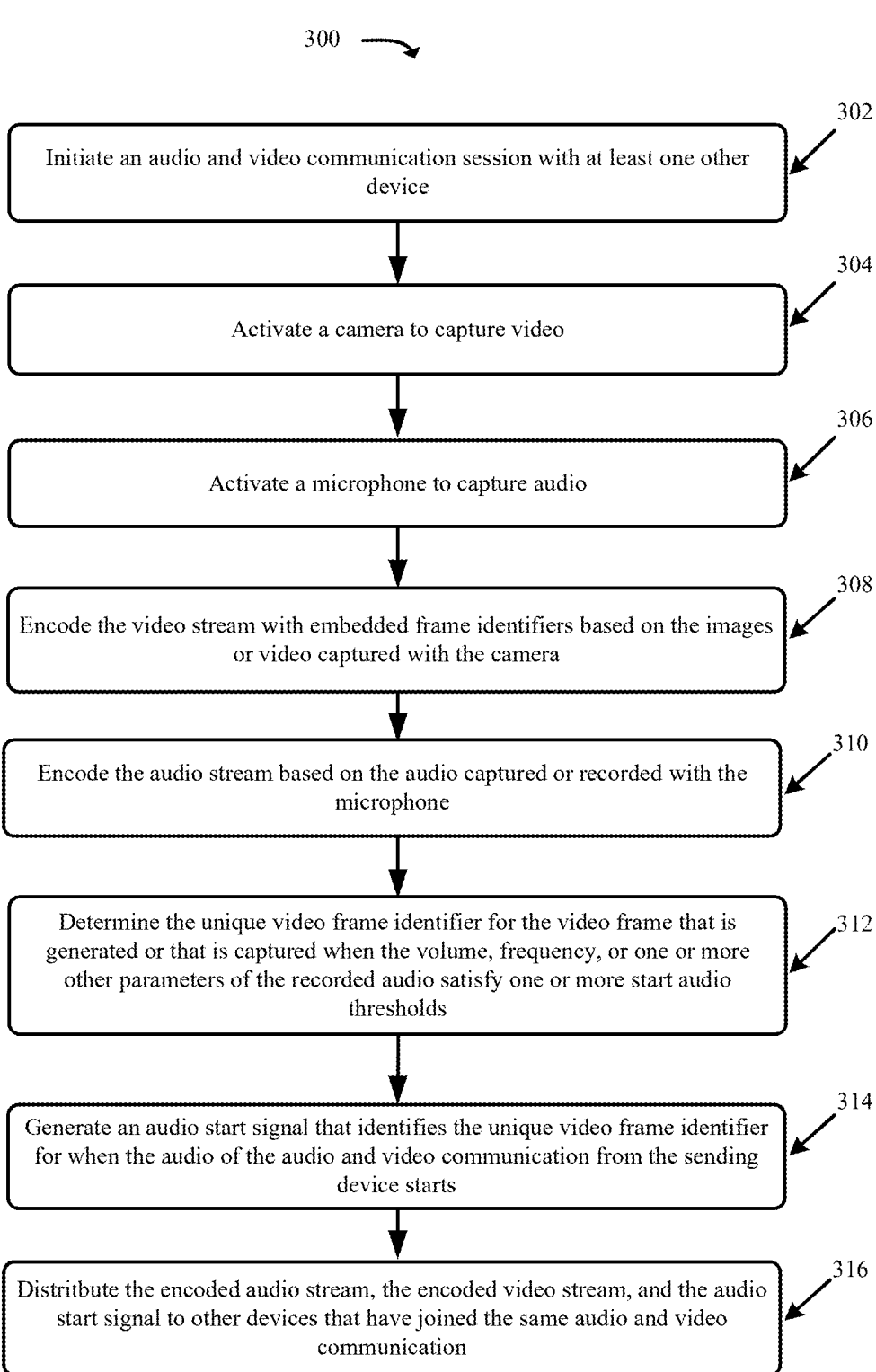

300

302
Initiate an audio and video communication session with at least one other device 304
Activate a camera to capture video 306
Activate a microphone to capture audio 308
Encode the video stream with embedded frame identifiers based on the images or video captured with the camera 310
Encode the audio stream based on the audio captured or recorded with the microphone 312
Determine the unique video frame identifier for the video frame that is generated or that is captured when the volume, frequency, or one or more other parameters of the recorded audio satisfy one or more start audio thresholds 314
Generate an audio start signal that identifies the unique video frame identifier for when the audio of the audio and video communication from the sending device starts 316
Distribute the encoded audio stream, the encoded video stream, and the audio start signal to other devices that have joined the same audio and video communication

FIG. 3

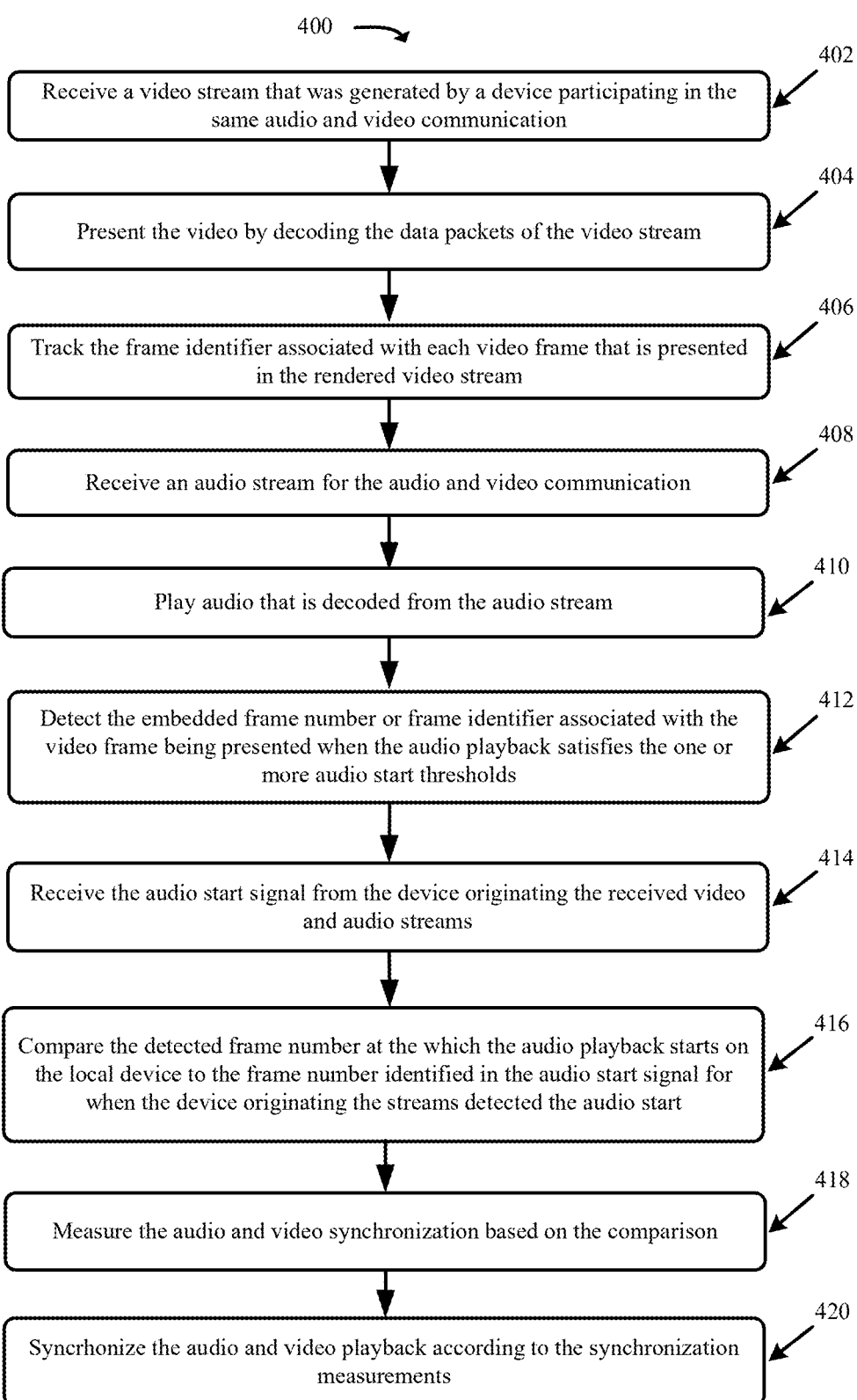

400

402
Receive a video stream that was generated by a device participating in the same audio and video communication 404
Present the video by decoding the data packets of the video stream 406
Track the frame identifier associated with each video frame that is presented in the rendered video stream 408
Receive an audio stream for the audio and video communication 410
Play audio that is decoded from the audio stream 412
Detect the embedded frame number or frame identifier associated with the video frame being presented when the audio playback satisfies the one or more audio start thresholds 414
Receive the audio start signal from the device originating the received video and audio streams 416
Compare the detected frame number at the which the audio playback starts on the local device to the frame number identified in the audio start signal for when the device originating the streams detected the audio start 418
Measure the audio and video synchronization based on the comparison 420
Syncrhonize the audio and video playback according to the synchronization measurements

FIG. 4

SYSTEMS AND METHODS FOR DETECTING AND CORRECTING AUDIO AND VIDEO SYNCHRONIZATION ISSUES

TECHNICAL FIELD

The present disclosure relates to the field of telecommunications and audio/video communications.

BACKGROUND

Calling, conferencing, and other communications that simultaneously support audio and video have improved the ability of users to remotely interact and communicate. However, the user experience is conditioned in part on the audio being synchronized with the video. Delays of a couple hundred milliseconds in the transmission, receipt, and/or processing of the audio and the video become noticeable and distracting. The delays may be caused by varying network conditions, device performance, and/or service provider performance. User may stop using a particular communication service or application in response to recurring synchronization issues in the audio and the video.

BRIEF DESCRIPTION OF THE DRAWINGS

FIG. 3 presents a process by which a sending device facilitates the accurate measurement of audio and video synchronization by a recipient device in accordance with some embodiments presented herein.

FIG. 4 presents a process for measuring audio and video synchronization based on the diagnostic data and timing data embedded in the received audio and video streams of an audio and video communication in accordance with some embodiments presented herein.

DETAILED DESCRIPTION OF PREFERRED EMBODIMENTS

Figure 1:
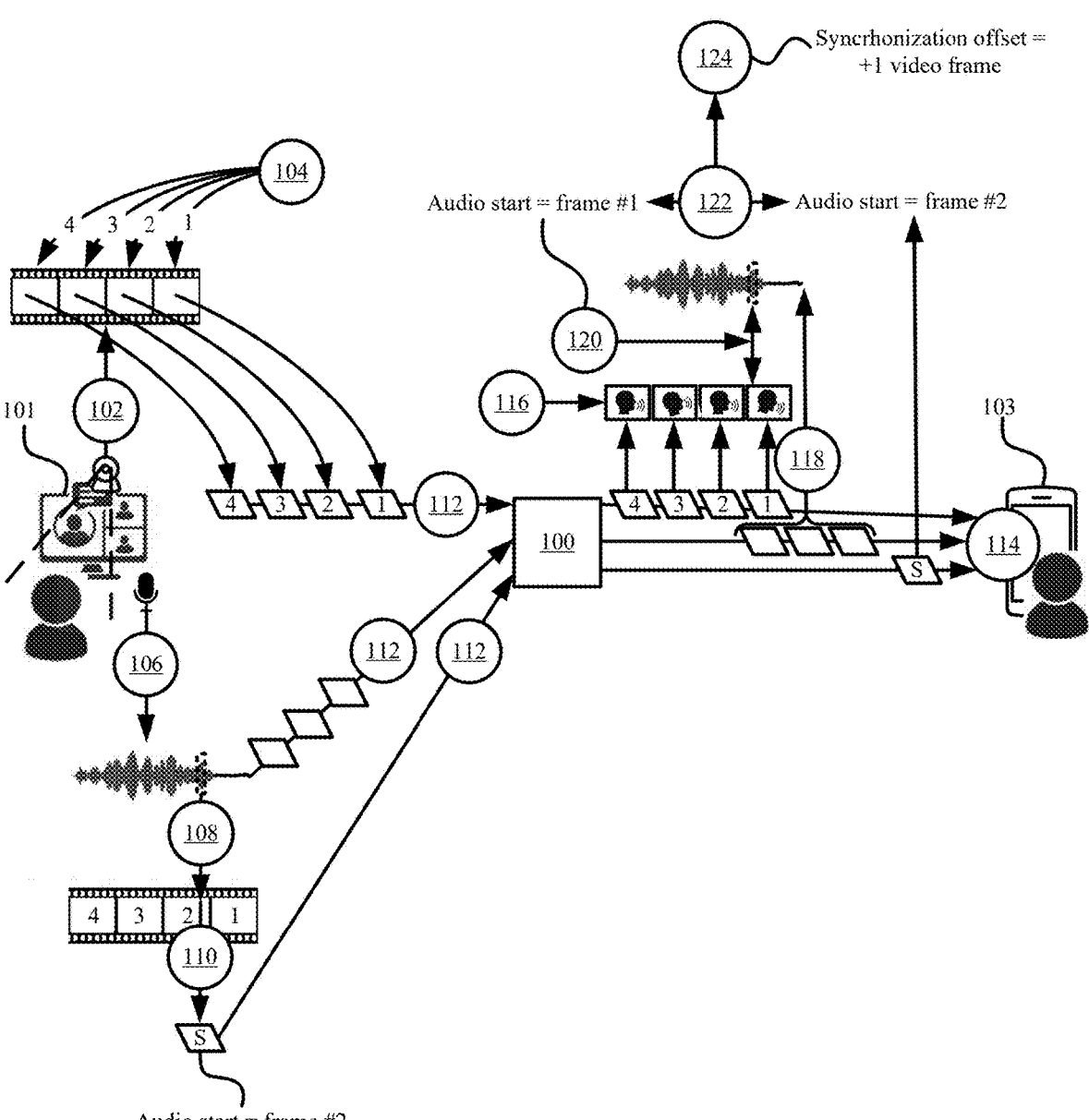
FIG. 1 illustrates an example for precisely measuring synchronization issues between audio and video streams of a communication in accordance with some embodiments presented herein.

This disclosure arises from the realization that synchronization issues between audio and video in a call, conference, or other communication have varying negative impacts on the user experience and may result in declining usage of the communication service or application. Synchronization issues may arise when the audio and video streams are offsets by tens, hundreds, or thousands of milliseconds. Such delays may create distractions or may cause the communications to become incomprehensible when visible cues are misaligned with the corresponding audible cues due to the delays. This disclosure further arises from the realization that accurate measurements for the amount that the audio and video are out-of-sync are needed in order to correct for any such synchronization issues. In other words, correcting audio and video synchronization involves detecting that there is a delay or offset between the streams and also quantifying the delay or offset in terms of a temporal or video frame measurement.

The current disclosure provides a technological solution for a technological problem in the fields of telecommunications and audio and/or video communications. The technological solution involves measuring offsets between the images from a video stream and the audio from an audio stream that are encoded and/or sent separately as part of an audio and video call, conference, or other communication. The offsets may be measured as a time value (e.g., a number of milliseconds by which the audio and video are out-of-sync) or as video frame count (e.g., a number of video frames that the video stream is ahead or behind the audio stream). The offsets provide diagnostics for determining misaligned audio and video, determining a cause for the misalignment, and/or determining remedial actions for improving the user experience. The remedial actions may include synchronizing the audio and video streams of the current communication by the amount measured in the offsets or adjusting the distribution of the data packets for the audio and/or video streams for subsequent communications that are established between two or more devices over a data network (e.g., a packet-switched data network such as the Internet). Accordingly, the technological solution improves network-based communications by providing communication service providers and/or end user devices the ability to correct for network issues, device performance, and/or service provider issues that introduce the delays between the audio and video streams of the same communication.

In some example embodiments, the technological solution is implemented within a communications system that hosts, establishes, and/or otherwise provides the audio and video communications to client devices. In some example embodiments, the technological solution is implemented in the client devices that use the communications system to establish the audio and video communications with one or more other client devices. For instance, the technological solution may be implemented as part of the dialer or conferencing application that the communications system provides to the client devices for communication with one another. In some other example embodiments, the technological solution is implemented by the communications system and the client devices. For instance, the communications system may detect and correct for synchronization issues occurring in the transmission of the audio and video streams from a sending device to the communications system, and the client device may detect and correct for synchronization issues occurring in the distribution of the audio and video streams from the communications system to one or more receiving devices.

The communications system and/or client devices detect synchronization issues in the audio and video streams of a communication in response to a sending client device embedding diagnostic data in the video frames of the video stream and distributing separate timing information for the detected start of the audio stream on the sending device to one or more receiving client devices. A receiving client device decodes the diagnostic data from the video frames, uses the diagnostic data to determine the exact frame in the video stream at which playback of the audio stream commences on that receiving device, and compares the determined starting frame for the audio playback on the receiving device to the timing information provided by the sending client device that indicates the video frame at which the same audio start was detected by the sending device. Based on the comparison, the receiving device may precisely measure any delay or offset in the audio and video of the communication based on the number of frames between the determined starting frame for the audio playback on the recipient device and the specified starting frame of the audio indicated by the sending device.

The recipient device may perform different ameliorative actions based on the determined amount of misalignment or the amount by which the audio and video streams are unsynchronized. For instance, if the video playback is ahead of the audio by a few frames or a few milliseconds (e.g., less than 100 milliseconds), the recipient device may drop one or more video frames or may slow playback of the video frames to resynchronize the streams. If the audio and video playback is misaligned or offset by many frames or hundreds of milliseconds, the recipient device may modify the resolution of the video stream to adjust the rate at which the video stream is received or may automatically disable the video stream.

FIG. 1 illustrates an example for precisely measuring synchronization issues between audio and video streams of a communication in accordance with some embodiments presented herein. The communication may include any form of communication that includes audio and video (e.g., conference, videochat, live presentation, live event, broadcast, etc.). The communication may be hosted by or accessed through communications system 100. For illustrative purposes, the communication is presented as being between two client devices 101 and 103. However, the communication may support additional client devices that communicate with one another at the same time or that simultaneously participate in the same communication. The communication is presented with one sending device 101 and one recipient device 103. For two-way communications (e.g., videochat, calling, conferencing, etc.), both of the two client devices may function as sending and recipient devices.

Sending device 101 begins capturing a video feed. For instance, a camera of sending device 101 records images of a user at a particular frame rate (e.g., 30 frames per second) in order to generate the video feed. Sending device 101 may encode (at 102) each image as a separate frame of a video stream for the communication that is sent to recipient device 103. Sending device 101 may use any one of several supported video codecs to perform the video stream encoding. As part of encoding the video frames, sending device 101 embeds (at 104) or encodes a frame number with or in each video frame. For instance, sending device 101 may sequentially number each frame of the video stream with an increasing scalar value.

Sending device 101 also captures an audio feed. For instance, a microphone of sending device 101 records audio (e.g., dialog, sounds, etc.) from the user and/or the surrounding environment. Sending device 101 uses one or more audio codecs to digitize the audio and/or encode (at 106) the captured audio as bits of the audio stream.

Sending device 101 detects (at 108) the video frame number at which the audio begins. Sending device 101 may detect the start of the audio when the volume or frequency of the captured audio exceeds a threshold. For instance, background noise may be at an insufficient volume or frequency to trigger the audio start. However, once the user begins speaking, the volume or frequency may reach a level that exceeds the audio start threshold. Sending device 101 generates (at 110) an audio start signal that indicates the video frame number at which the audio begins or when sending device 101 detected audio that satisfied the audio start threshold. In some example embodiments, the audio start signal is one or more data packets that are sent apart from the video and audio streams for establishing or configuring the communication between sending device 101 and recipient device 103. In some example embodiments, the audio start signal is metadata or header information sent as part of the audio stream.

Sending device 101 transmits (at 112) the audio and video streams and the audio start signal to recipient device 103 via communications system 100. More specifically, sending device 101 transmits (at 112) a first set of data packets encoding the video with the embedded or added frame numbers, a second set of data packets encoding the audio, and one or more data packets for the audio start signal according to a streaming or communication protocol over a data network.

In some example embodiments, communications system 100 processes one or more of the audio and/or video streams prior to forwarding to recipient device 103. For instance, if there are multiple sending devices 101, communications system 100 may mix or combine the audio streams from the multiple sending devices 101 into a single audio stream that is forwarded to recipient device 103. Other processing may include upscaling or downscaling the video stream, changing the video stream frame rate, and/or adding special effects or graphics to the video stream.

Recipient device 103 receives (at 114) the data packets for the separate audio and video streams and the audio start signal. Network performance (e.g., congestion, latency, downed links, packet loss, etc.), encoding performance of sending device 101, and processing performance of communications system 100 may impact when recipient device 103 receives the data packets. Better network performance may cause the data packets to arrive earlier or with less latency or delay. Worse network performance may cause the audio stream data packets to arrive before the video stream data packets because of the less amount of data that is contained in the audio stream than the video stream.

Recipient device 103 decodes and renders (at 116) the frames of the video stream. In decoding the video stream, recipient device 103 extracts the frame numbers that sending device 101 embedded (at 104) in each frame.

Recipient device 103 decodes and starts (at 118) playback of the audio stream. Recipient device 103 analyzes the decoded audio signal to determine (at 120) when the audio starts. For instance, recipient device 103 determines (at 120) when the audio signal has a threshold volume or frequency and the number of the video frame that is played back on recipient device 103 when the audio signal has the threshold volume or frequency.

Recipient device 103 compares (at 122) the timing information from the audio start signal sent by sending device 101 to the timing of the audio start detected from recipient device 103 decoding and playing back the received audio and video streams. Recipient device 103 detects (at 124) a number of frames by which the playback of the received audio and video streams are unsynchronized based on the comparison.

Figure 2:
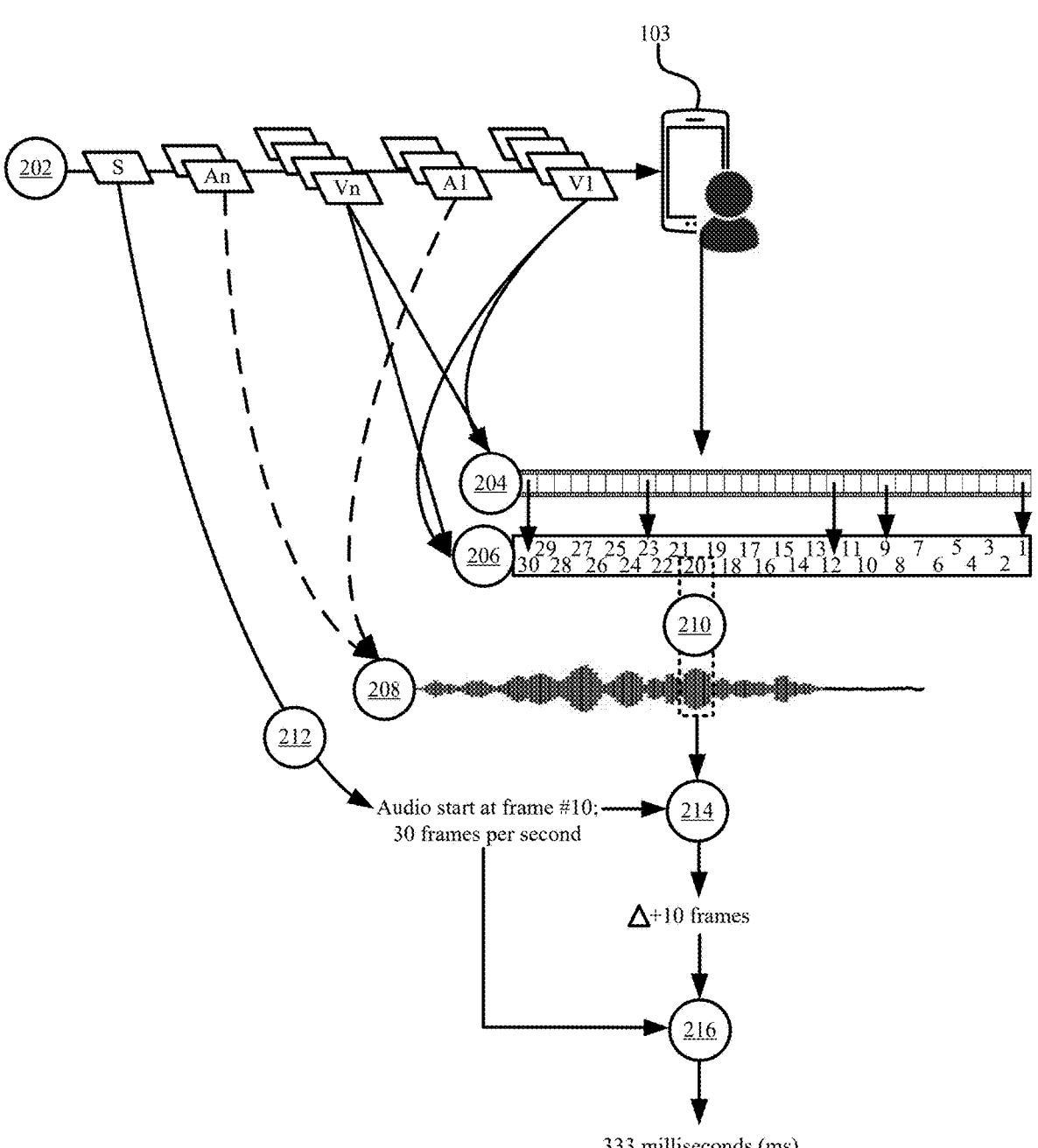
FIG. 2 illustrates an example for precisely measuring the temporal offset in the playback of the audio and video streams using an audio start signal and video frame identifiers embedded in the video stream in accordance with some embodiments presented herein.

FIG. 2 illustrates an example for precisely measuring the temporal offset in the playback of the audio and video streams using the received audio start signal provided by sending device 101 and the embedded number of the video frame at which the audio is detected to start on recipient device 103 in accordance with some embodiments presented herein. Recipient device 103 receives (at 202) a first set of data packets that encode a first set of frames of the video stream (labeled as data packets V1 to Vn), a second set of data packets that encode a first duration of audio from the audio stream (labeled as data packets A1 to An), and the audio start signal generated by sending device 101 (labeled as data packet S). The audio start signal may be a data packet that is sent separate from the first and second sets of data packets or may be included in the metadata or headers of one or more of the first and second sets of data packets. The data packets of the audio and video streams may intermixed. In other words, recipient device 103 may receive (at 202) some of the first set of data packets, some of the second set of data packets, and then more of the first set of data packets.

Recipient device 103 decodes the first set of data packets as they are received, and begins playback (at 204) of the video stream based on the video data or images decoded from the first set of data packets. Decoding the first set of data packets also includes decoding (at 206) the frame reference number that sending device 101 embedded with each captured frame of the video stream.

Recipient device 103 decodes the second set of data packets as they are received, and begins playback (at 208) of the audio stream based on the audio signal that is decoded from the second set of data packets. Recipient device 103 detects (at 210) a spike in the audio signal that satisfies an audio start threshold when the $20^{th}$ video frame decoded from the video stream is presented.

Recipient device 103 determines (at 212) that sending device 101 captured the same start of the audio signal (e.g., audio spike that satisfies the audio start threshold) when sending device 101 recorded or captured the $10^{th}$ video frame based on the timing information in the received audio start signal. Recipient device 103 may also determine (at 212) from the audio start signal that sending device 101 captured the video stream at 30 frames per second. The captured frame rate is relevant in the event that the camera of sending device 101 captures the video stream at a frame rate that is different than the frame rate at which the video stream encodes the video or the frame rate at which communications system 100 forwards the video stream to recipient device 103. For instance, sending device 101 may capture and encode the video stream at 30 frames per second. Communications system 100 may reduce the video stream frame rate from 30 frames per second to 24 frames per second to optimize the video stream for redistribution by lowering the total amount of data encoded to the video stream.

Assuming that the frame rate did not change between capturing, encoding, and transmission of the video stream, recipient device 103 determines (at 214) that the communication audio is delayed relative to the communication video by 10 frames on recipient device 103. Recipient device 103 may determine the actual audio/video synchronization delay or the temporal offset between the audio and video by converting (at 216) the number of frames (e.g., 10 frames) to a temporal value using the determined frame rates. For instance, the 10 frame misalignment between the audio and the video being played back at 30 frames per second results in an audio/video synchronization delay of approximately 333 milliseconds.

FIG. 3 presents a process 300 by which sending device 101 facilitates the accurate measurement of audio and video synchronization by recipient device 103 in accordance with some embodiments presented herein. Accordingly, process 300 is implemented by sending device 101. More specifically, process 300 is implemented by an application, service, or other system that runs on sending device 101 for connecting to and communicating with other devices via audio and video calling, conferencing, and/or other communication services provided by communications system 100.

Sending device 101 may include a smartphone, tablet, computer, set top, or other device for audio and video communications. Sending device 101 may include or have attached a microphone for capturing or recording audio, a speaker for playing back audio, a camera for capturing or recording images or video, a display for playing back video, and processor, memory, storage, network, and/or other hardware resources for transmission of audio and video streams generated locally on sending device 101 for playback on other devices connected to the same communication and/or for receipt of audio and video streams generated by the other devices connected to the same communication.

Process 300 includes initiating (at 302) an audio and video communication session with at least one other device. Initiating (at 302) the audio and video communication session may include dialing the telephone number of the other device to start a videochat, issuing a request to a Uniform Resource Locator (URL) at which the audio and video communication is accessed, or accessing another link, identifier, or destination associated with the audio and video communication.

Process 300 includes activating (at 304) a camera of sending device 101. Activating (at 304) the camera includes capturing images or a video at a particular frame rate using the camera.

Process 300 includes activating (at 306) a microphone of sending device 101. Activating (at 306) the microphone includes recording audio using the microphone. In some example embodiments, sending device 101 activates (at 304 and 306) the camera and microphone at the same time or contemporaneously after or before initiating (at 302) the audio and video communication session. In some other examples, sending device 101 activates (at 304 and 306) the camera and microphone at different times. For instance, sending device 101 may initiate (at 302) the audio and video communication session with audio recording enabled and with video disabled or with video enabled and audio muted until the user manually unmutes the audio stream.

Process 300 includes encoding (at 308) the video stream with embedded frame identifiers based on the images or video captured with the camera. Encoding (at 308) the video stream includes digitizing the images or video into bits according to a video codec. For instance, sending device 101 may use one or more of the H.264, Video Processor 8 (VP8), or another video codec to encode (at 308) the video stream. The video stream may be encoded (at 308) at the same frame rate or a different frame rate than the frame rate at which the camera captures or records the images or video.

Encoding (at 308) the video stream may also include identifying each video frame with a unique identifier. The unique identifier may be a sequentially increasing numerical value (e.g., 1, 2, 3, etc.). In some example embodiments, the unique identifier is encoded with the image data for the video frame being encoded. The unique identifier may be encoded with the image data by encoding the unique identifier in place of the image data for certain pixels of the frame (e.g., replace the bits for the bottom pixels of each video frame with the unique identifier). Accordingly, the video frame identifier may distort or corrupt a very small region of the image. To account for any such distortions, recipient devices 103 may decode or extract the video frame identifier
and render a cropped image based on the remaining image
data or pixels that were not modified in order to encode the
video frame identifier. In some other example embodiments,
the unique identifier is added as metadata, a header value, or
a customizable field of the encoded video stream.

Process 300 includes encoding (at 310) the audio stream
based on the audio captured or recorded with the micro-
phone. Encoding (at 310) the audio stream includes digitiz-
ing the audio into bits according to an audio codec. Any of
several different supported audio codecs may be used for the
audio stream encoding (at 310).

Process 300 includes determining (at 312) the unique
video frame identifier for the video frame that is generated
or that is captured when the volume, frequency, or one or
more other parameters of the recorded audio satisfy one or
more start audio thresholds. For instance, the one or more
start audio thresholds are satisfied when the audio frequency
exceeds 100 Hertz. Sending device 101 may identify the
audio start based on the specified change in the volume,
frequency, or one or more other parameters rather than when
the microphone begins recording or is activated (at 306)
because the specified change is a more accurate indicator of
the audio start that can be detected by recipient device 103.
For instance, to optimize the audio stream during the audio
encoding (at 310), no bits may be used to encode periods of
silence or periods where only background noise is detected
and removed by a noise cancellation technique.

Process 300 includes generating (at 314) an audio start
signal that identifies the unique video frame identifier for
when the audio of the audio and video communication from
sending device 101 starts. The audio start signal may be a
data packet that is generated apart from the audio and video
streams or may be included in headers, metadata, or pay-
loads of the one or more data packets of the encoded audio
or video streams.

Process 300 includes distributing (at 316) the encoded
audio stream, the encoded video stream, and the audio start
signal from sending device 101 to communications system
100 for optimization, processing, and/or redistribution to
other devices that have joined or participated in the same
audio and video communication session. The data packets of
the encoded audio stream, the encoded video stream, and the
audio start signal are distributed across a packet-switch data
network using one or more streaming protocols. For
instance, the data packets may be distributed (at 316)
according to formatting or timing of the Real Time Transport
Protocol (RTP). The data packets for the audio and video
streams may be synchronized or temporally aligned when
distributed (at 316) from sending device 101. In some
instances, the data packets may not be synchronized or
temporally aligned when distributed (at 316) from sending
device 101 due to insufficient sending device 101 resources
or bandwidth. For instance, sending device 101 may require
all processing resources to encode (at 308) the video stream
such that the encoding (at 310) of the audio stream occurs
after a certain number of frames of the video stream have
been encoded and with sending device 101 switching back-
and-forth between encoding and distributing different
chunks of video and audio.

FIG. 4 presents a process 400 for measuring audio and
video synchronization based on the diagnostic data and
timing data embedded in the received audio and video
streams of an audio and video communication in accordance
with some embodiments presented herein. Process 400 is
implemented by recipient device 103 or a system that runs
on recipient device 103. In some example embodiments, recipient device 103 may also function as sending device
101 at the same time or different times. For instance,
recipient device 103 receives and plays back audio and
video streams from other sending devices 101 while simul-
taneously generating and distributing its own audio and
video streams to the other sending devices 101 based on
audio and video captured with a microphone and camera of
recipient device 103.

Process 400 includes receiving (at 402) a video stream
that was generated by sending device 101, wherein sending
device 101 participates in the same audio and video com-
munication as recipient device 103. The video stream may
be modified by communications system 100 while enroute to
recipient device 103. For instance, communications system
100 may change the frame rate, resolution, or other aspects
of the encoding and, in doing so, may introduce or remove
delay in the time recipient device 103 receives the video
stream relative to the audio stream.

Process 400 includes presenting (at 404) the video from
sending device 101 by decoding the data packets of the
video stream. Presenting (at 404) the video includes render-
ing the video stream at the resolution, frame rate, and/or
other encoding parameters of the received (at 402) video
stream.

Process 400 includes tracking (at 406) the frame identifier
associated with each video frame that is presented (at 404)
in the rendered video stream. The frame identifier is encoded
with the image data of each video frame and is extracted
when recipient device 103 decodes the video stream.

Process 400 includes receiving (at 408) an audio stream
for the audio and video communication. In some example
embodiments, the audio stream may include the audio
recorded and encoded by sending device 101 providing the
video stream. In some other example embodiments, the
audio stream from sending device 101 is processed at
communications system 100 before being distributed to
recipient device 103. In some such example embodiments,
communications system 100 may combine or mix the audio
stream from sending device 101 with audio streams from
other sending devices 101 participating in the same audio
and video communication. Processing of the audio stream at
communications system 100 may also introduce or remove
delay in the time recipient device 103 receives the video
stream relative to the audio stream. In other words, the audio
processing performed at communications system 100 along
with video stream processing and network performance may
cause the audio and video streams to become unsynchro-
nized.

Recipient device 103 may receive (at 408) the data
packets of the audio stream before, after, or contemporane-
ously with the data packets of the video stream. For instance,
data packets encoding audio for a first segment of the
communication may be received before data packets encod-
ing video for the first segment, data packets encoding audio
for a second segment of the communication may be received
at the same time as data packets encoding video for the
second segment, and data packets encoding audio for a third
segment of the communication may be received after data
packets encoding video for the third segment. The order by
which the data packets for the audio and video streams may
change throughout the communication based on the order at
which sending device 101 sends the data packets, commu-
nications system 100 processes the data packets, and/or
changing network performance along the same or different
network paths affects the delivery of the data packets.

Process 400 includes playing (at 410) audio that is
decoded from the audio stream through a speaker of recipient device 103. In some example embodiments, the resources or performance of recipient device 103 may also cause the playback of the audio and the presentation of the video to become unsynchronized. For instance, recipient device 103 may require more resources than are available to decode the video and the audio resulting in a delay being introduced during the playback of one or both.

Process 400 includes detecting (at 412) the embedded frame number or frame identifier associated with the video frame being presented when the audio playback on recipient device 103 satisfies the one or more audio start thresholds. The audio start corresponds to a change in the playback of the audio signal that satisfies the one or more audio start thresholds. In some example embodiments, the audio start threshold corresponds to an initial spike, frequency change, or volume increase in the audio signal that exceeds a defined value. For instance, the first few seconds of the decoded audio may record silence or background noise that remains mostly constant and below a frequency of 100 Hertz. However, when a user begins speaking or an audible sound is recorded by the microphone, the decoded audio may spike above 100 Hertz and provide a reliable indicator that the audio has started. Recipient device 103 and sending device 101 are configured with the same one or more audio start thresholds.

Process 400 includes receiving (at 414) the audio start signal from sending device 101 that originates the received (at 402 and 408) video and audio streams. The audio start signal identifies the frame number or frame identifier at which sending device 101 detected the audio start (e.g., audio signal satisfied the one or more audio start thresholds on sending device 101).

Process 400 includes comparing (at 416) the detected frame number at the which the audio playback starts on recipient device 103 to the frame number identified in the audio start signal for when sending device 101 detected the audio start. Process 400 includes measuring (at 418) the audio and video synchronization based on the comparison (at 416). Measuring (at 418) the audio and video synchronization may include converting the difference in frame numbers for the audio start at recipient device 103 and sending device 101 into a temporal value. Specifically, recipient device 103 determines the frame rate of the video and computes the temporal value based on the number of frames associated with the difference in the detected audio start and the time associated with each frame. Measuring (at 418) the audio and video synchronization may include presenting the difference in frame number or the computed temporal value as diagnostic data on a user interface or display of recipient device 103 or presenting the diagnostic data to communications system 100.

Process 400 includes synchronizing (at 420) the audio and video playback according to the synchronization measurements. Synchronizing (at 420) the audio and video playback may include performing one of several different adjustments to the audio and video streams and/or processing of the streams based on the scope of the detected synchronization issues.

In some example embodiments, recipient device 103 modifies the encoding of the video stream to remove some frames or add duplicate frames to synchronize the audio and video. In some other example embodiments, recipient device 103 adjusts the video stream resolution or quality to reduce the amount of data and/or overall time for recipient device 103 to receive and render the video stream. In still some other example embodiments, recipient device 103 may automatically disable the video stream when the audio and video are out-of-sync by more than a certain amount of time or number of frames.

In some example embodiments, the synchronization (at 420) is performed by communications system 100. For instance, recipient device 103 presents the synchronization measurements and/or other diagnostics related to the audio and video synchronization to communications system 100. The diagnostics may include the frame number variance for the detected audio start or the computed temporal synchronization offset. Communications system 100 then modifies the encoding of the video stream, the distribution of the streams to recipient device 103, and/or performs other adjustments to improve the synchronization between the audio and video.

In some other example embodiments, communications system 100 performs process 400 in conjunction with or instead of recipient device 103 in order to obtain diagnostics for the synchronization issues that may occur as a result of network congestion and/or other conditions affecting the network path and/or transmission of the video and audio streams from sending device 101 to communications system 100. Communications system 100 may correct the synchronization issues that arises during the generation and transmission of the audio and video streams from sending device 101 to communications system 100 and prior to communications system 100 forwarding the audio and video streams to recipient device 103.

Figure 5:
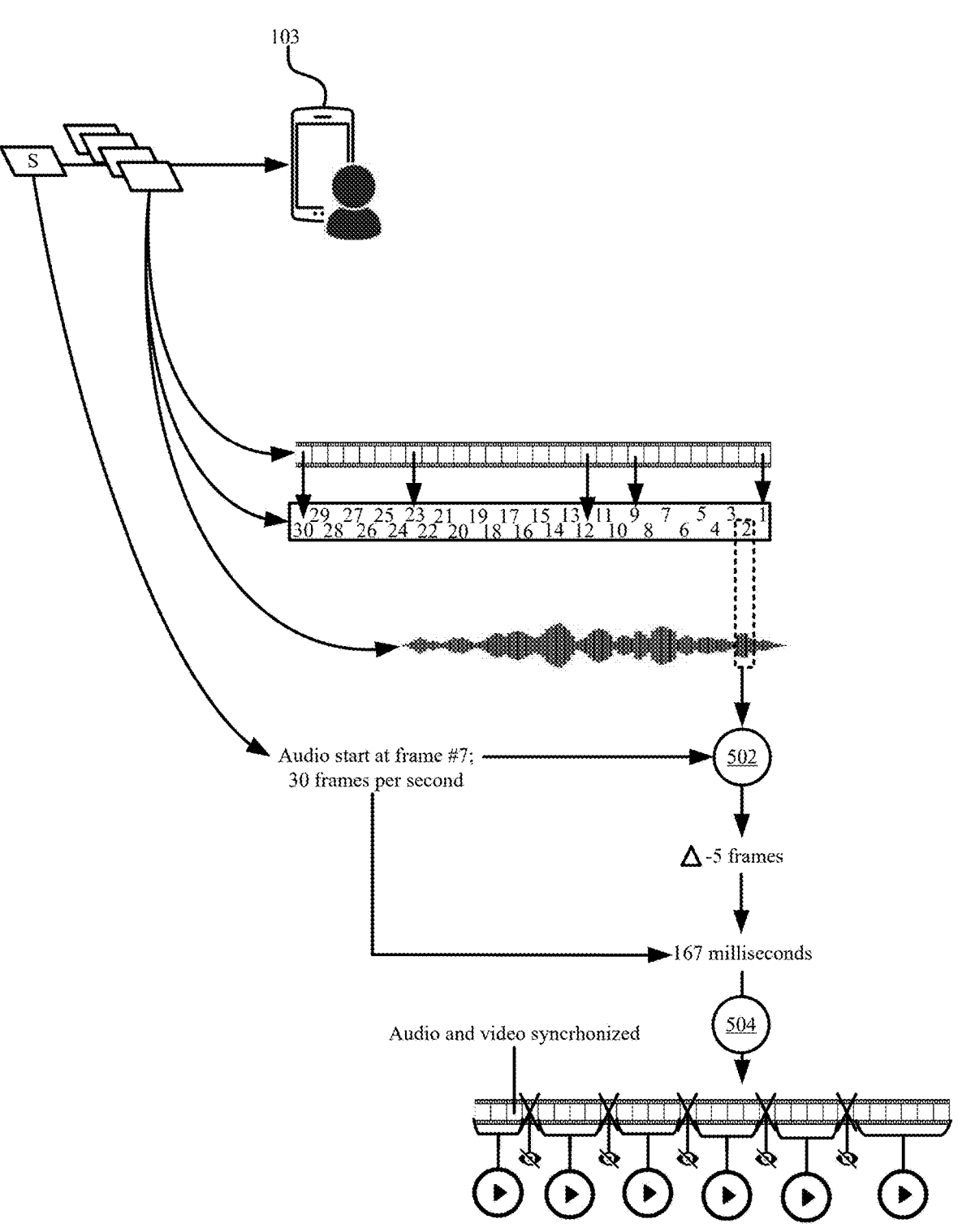
FIG. 5 illustrates an example of automatically synchronizing audio and video of a communication based on the generated synchronization measurements in accordance with some embodiments presented herein.

FIG. 5 illustrates an example of automatically synchronizing audio and video of a communication based on the synchronization measurements generated by recipient device 103 in accordance with some embodiments presented herein. Recipient device 103 uses the embedded frame numbers and audio start signal provided by sending device 101 to determine (at 502) that the audio playback is 5 frames behind the video playback. Temporally, the 5 frame delay at a 30 frame per second video playback results in about a 167 millisecond synchronization offset.

Recipient device 103 corrects (at 504) for the synchronization delay by selectively dropping frames from the video playback to allow the audio playback to catch up to the proper frame of the video without noticeably affecting the video playback or the user experience. For instance, recipient device 103 drops every fifth frame in the next second of the video stream to remove the 5-frame delay and resynchronize the audio and video for the call, conference, or communication. Dropping every fifth frame may include temporarily reducing the playback frame rate of 30 frames per second to 25 frames per second for the next second or not rendering every fifth frame for the one second duration.

Figure 6:
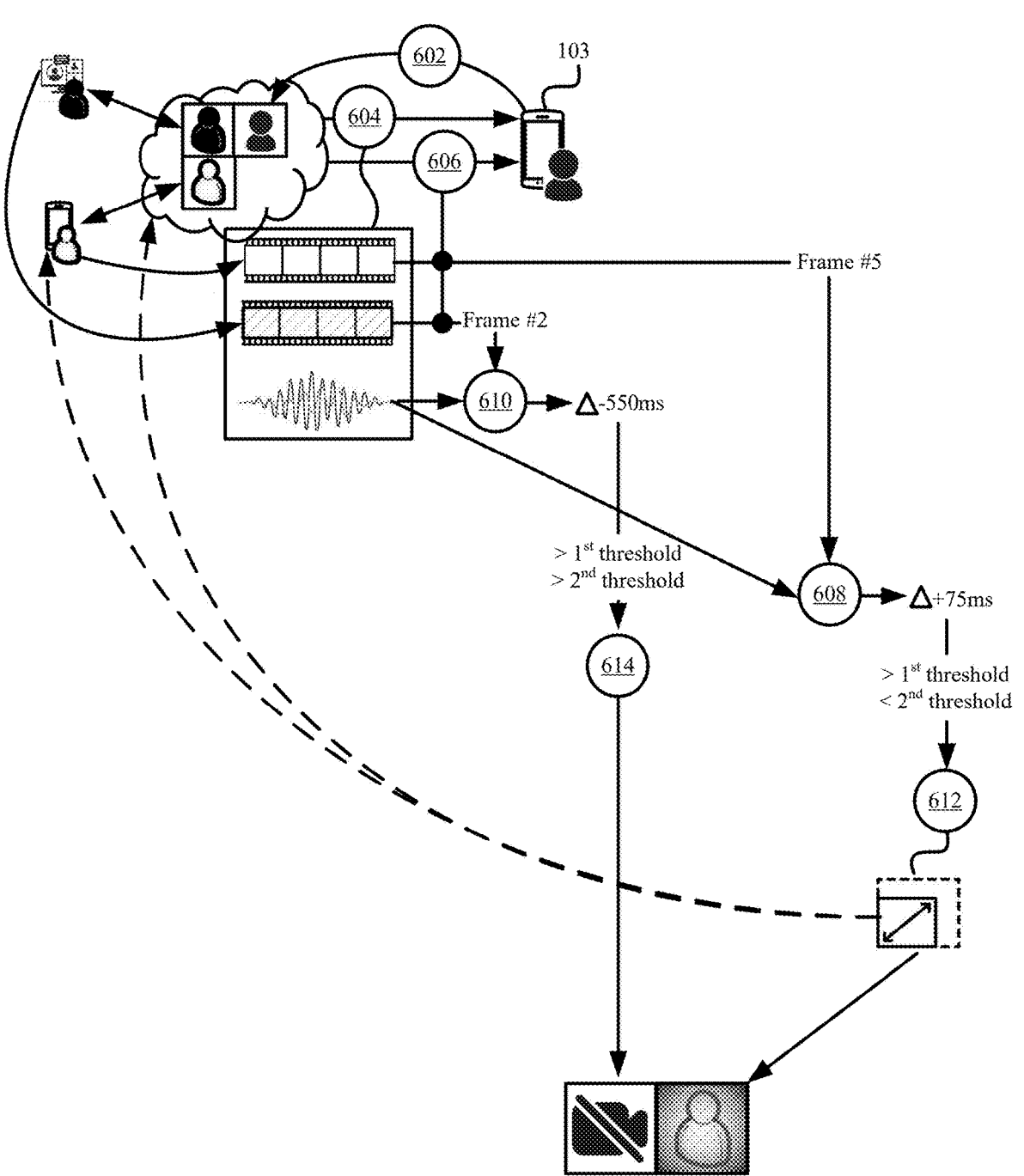
FIG. 6 illustrates an example of implementing different synchronization corrections for synchronization issues of different lengths or sizes in accordance with some embodiments presented herein.

Recipient device 103 may implement other synchronization corrections for larger synchronization offsets or other synchronization issues that may not be correctable by changing the frame rate without noticeably degrading the user experience. FIG. 6 illustrates an example of implementing different synchronization corrections for synchronization issues of different lengths or sizes in accordance with some embodiments presented herein.

Recipient device 103 enters (at 602) into a conference with two other participants. Recipient device 103 receives (at 604) a first video stream of the first participant, a second video stream of the second participant, and a single audio stream that communications system 100 generates from receiving and combining the audio streams from the first participant and the second participant. Recipient device 103 also receives (at 606) different audio start signals from the first participant and the second participant that indicate the frame number at which each participant began speaking or the audio for the audio stream from that participant satisfied an audio start threshold.

Recipient device 103 determines (at 608) a first synchronization offset between the first video stream and the single audio stream based on the audio start signal from the first participant and the frame number at which recipient device 103 detects the audio starting in the single audio stream, and determines (at 610) a second synchronization offset between the second video stream and the single audio stream based on the audio start signal from the second participant and the frame number at which recipient device 103 detects the audio starting in the single audio stream. The second synchronization offset is greater than the first synchronization offset.

When determining the audio start in a single audio stream that combines audio streams from different sending devices 101, the audio start indicated in the different audio start signals from the first participant and the second participant may correspond to the first sound or first change in the audio signal from either the audio that is being recorded locally or being played back on that sending device 101 and that satisfies the one or more audio start thresholds. In this manner, the different devices reference the same sound in generating their audio start signals whether that sound is captured by a microphone of the device or is detected in the received single audio stream that is played back on a speaker of that device.

Recipient device 103 performs (at 612) a first corrective action based on the first synchronization offset exceeding a first threshold. The first corrective action includes automatically lowering the resolution of the first video stream or requesting that communications system 100 send the first video stream at a lower resolution so that the first video stream may be sent to recipient device 103 in less time due to the first video stream being encoded with less data and/or so that recipient device 103 spends less time and resources processing the lowered resolution first video stream. By lowering the resolution, recipient device 103 is able to retain or improve the audio and video synchronization or prevent further increase in the synchronization delay. In some example embodiments, communications system 100 may store the resolution at which recipient device 103 is able to receive and present a video stream or simultaneously present multiple video streams without synchronization delay, and may start new communications involving recipient device 103 at the stored resolution.

Recipient device 103 performs (at 614) a second corrective action based on the second synchronization offset exceeding the first threshold and a second threshold. The second corrective action includes automatically disabling the second video stream on recipient device 103. For instance, the audio and video associated with the second participant may become overly unsynchronized and cannot be corrected in a reasonable amount of time (e.g., less than 5 seconds) without significant disruption in the user experience. Accordingly, recipient device 103 may halt playback of the second video stream until conditions improve at which time recipient device 103 may synchronize and restore the second video stream.

In some example embodiments, sending devices 101 may be configured to periodically generate an audio synchronization signal during an ongoing call, conference, or other communication. The first audio synchronization signal may signal the audio start and may correspond to the audio start signal described above. Additional audio synchronization signals may be generated at a fixed interval relative to the audio start signal or in response to detecting specific patterns or changes in the audio signal. For instance, sending device 101 may generate an audio synchronization signal that it sends to recipient device 103 every 5 seconds after the audio start signal. Alternatively, sending device 101 may generate an audio synchronization signal whenever there is a period of silence (e.g., frequency or volume drops below a threshold) in the audio signal followed by a spike in the audio signal (e.g., frequency or volume exceeds the threshold). Each audio synchronization signal includes the frame number or frame identifier for the exact frame in the video stream being generated by sending device 101 that the audio synchronization signal corresponds to.

Recipient device 103 may reference the different audio synchronization signals from sending device 101 to detect synchronization issues between the audio and video of a communication that arise after the communication has started and/or that occur throughout the communication. For instance, intermittent network issues may introduce synchronization delay between the audio and video over time, and recipient device 103 may use the audio synchronization signals sent throughout the communication to detect and/or correct the synchronization delay before the synchronization delay becomes noticeable and/or large enough to degrade the user experience.

Figure 7:
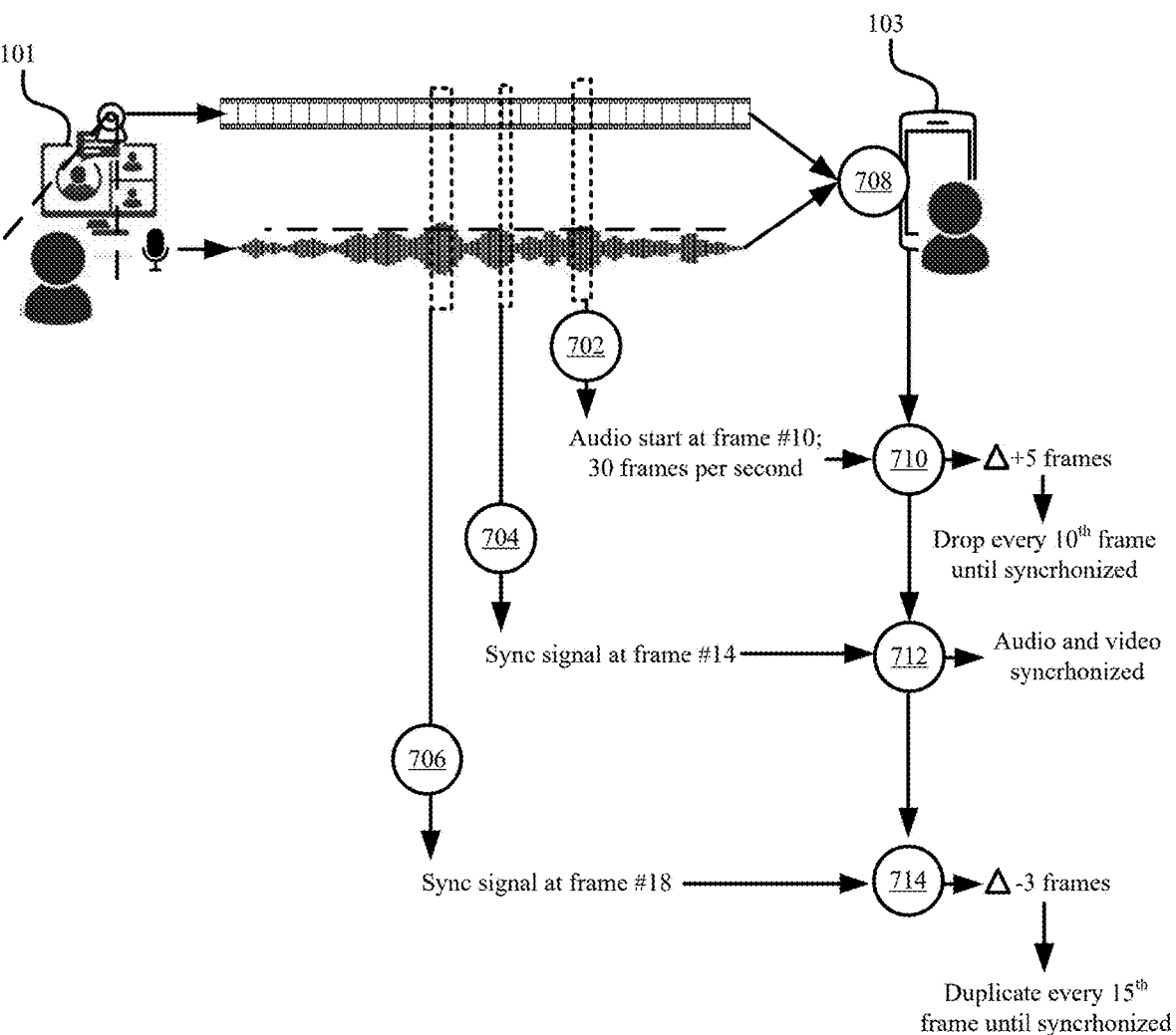
FIG. 7 illustrates an example of audio synchronization signals being sent and used throughout a communication to diagnose and correct audio and video synchronization in accordance with some embodiments presented herein.

FIG. 7 illustrates an example of audio synchronization signals being sent and used throughout a communication to diagnose and correct audio and video synchronization in accordance with some embodiments presented herein. Sending device 101 generates (at 702) the audio start signal to indicate the exact frame in the video stream being generated by sending device 101 when sending device 101 detects the audio of the communication satisfying one or more thresholds. Sending device 101 also generates (at 704 and 706) audio synchronization signals throughout the communication to indicate the exact frames in the video stream when sending device 101 detects the audio of the communication again satisfying the same thresholds, certain patterns, or other thresholds.

Recipient device 103 receives (at 708) the audio and video streams for the communication and decodes the audio and video streams to play the corresponding audio and video. Recipient device 103 receives the audio start signal and uses the audio start signal with the frame numbers that are decoded from the video stream to determine (at 710) if the playback of the audio and the video on recipient device 103 at the start of the communication is synchronized. Recipient device 103 may correct any synchronization issues at the audio start to prevent the synchronization delay from growing and/or becoming worse.

Similarly, recipient device 103 receives the subsequent audio synchronization signals and uses the audio synchronization signals with the frame numbers that are decoded from the video stream to determine (at 712 and 714) if the playback of the audio and the video on recipient device 103 remains synchronized throughout the communication. Every audio synchronization signal provides another opportunity for recipient device 103 to perform a synchronization check and restore synchronization at different points throughout the communication.

The embodiments presented above are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms "a," "an," and "the" include plural references unless the context clearly dictates otherwise.

Some portions of the above descriptions are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things ("IoT") devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and nonvolatile, removable and non-removable media implemented in any method or technology for storage of information such as computer-readable instructions, data structures, program modules, or other data. Computer storage media can include, but is not limited to, random access memory ("RAM"), read only memory ("ROM"), electrically erasable programmable ROM ("EEPROM"), flash memory, or other memory technology, compact disk ROM ("CD-ROM"), digital versatile disks ("DVDs") or other optical storage, solid state drives, hard drives, hybrid drive, or any other medium that can be used to store the desired information and that can be accessed to retrieve that information.

It is appreciated that the presented systems and methods can be implemented in a variety of architectures and configurations. For example, the systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

The invention claimed is:

1. A computer-implemented method for measuring audio and video synchronization in a communication, the computer-implemented method comprising:

receiving a video stream and an audio stream of the communication with a synchronization signal;

decoding a plurality of video frames and a unique frame identifier for each video frame of the plurality of video frames from the video stream;

decoding an audio signal from the audio stream;

detecting the unique frame identifier of a particular video frame that is played back at a same time at which the audio signal satisfies a threshold; and measuring a synchronization offset between playback of the video stream and the audio stream based on a difference between the unique frame identifier of the particular video frame and the unique frame identifier of a different video frame that is identified in the synchronization signal.

2. The computer-implemented method of claim 1, wherein measuring the synchronization offset comprises:

determining a number of frames by which the playback of the video stream is ahead or behind of the playback of the audio stream based on the difference between the unique frame identifier of the particular video frame and the unique frame identifier of the different video frame that is identified in the synchronization signal.

3. The computer-implemented method of claim 1, wherein measuring the synchronization offset comprises:

generating a temporal measurement based on a frame rate of the video stream and the difference between the unique frame identifier of the particular video frame and the unique frame identifier of the different video frame that is identified in the synchronization signal.

4. The computer-implemented method of claim 1, further comprising:

performing a first correction of the audio and video synchronization based on the difference being less than a synchronization threshold; and performing a different second correction of the audio and video synchronization based on the difference being greater than the synchronization threshold.

5. The computer-implemented method of claim 1, further comprising:

synchronizing the playback of the video stream and the audio stream according to the difference.

6. The computer-implemented method of claim 5, wherein synchronizing the playback comprises:

discarding playback of one or more video frames from the plurality of video frames based on the difference indicating that the playback of the video stream is behind the playback of the audio stream; and duplicating playback of one or more video frames from the plurality of video frames based on the difference indicating that the playback of the video stream is ahead of the playback of the audio stream.

7. The computer-implemented method of claim 1, wherein the unique frame identifier of each video frame is encoded as part of image data of that video frame.

8. The computer-implemented method of claim 1, further comprising:

presenting the difference as diagnostic data on a user interface.

9. The computer-implemented method of claim 1, further comprising:

presenting the communication by rendering the plurality of video frames and playing back the audio signal as the video stream and the audio stream are decoded.

10. The computer-implemented method of claim 1, further comprising:

adjusting a resolution of the video stream in response to the difference indicating that the playback of the video stream is not synchronized with the playback of the audio stream.

11. A system for measuring audio and video synchronization in a communication, the system comprising:

one or more hardware processors configured to:

receive a video stream and an audio stream of the communication with a synchronization signal;

decode a plurality of video frames and a unique frame identifier for each video frame of the plurality of video frames from the video stream;

decode an audio signal from the audio stream;

detect the unique frame identifier of a particular video frame that is played back at a same time at which the audio signal satisfies a threshold; and measure a synchronization offset between playback of the video stream and the audio stream based on a difference between the unique frame identifier of the particular video frame and the unique frame identifier of a different video frame that is identified in the synchronization signal.

12. The system of claim 11, wherein measuring the synchronization offset comprises:

determining a number of frames by which the playback of the video stream is ahead or behind of the playback of the audio stream based on the difference between the unique frame identifier of the particular video frame and the unique frame identifier of the different video frame that is identified in the synchronization signal.

13. The system of claim 11, wherein measuring the synchronization offset comprises:

generating a temporal measurement based on a frame rate of the video stream and the difference between the unique frame identifier of the particular video frame and the unique frame identifier of the different video frame that is identified in the synchronization signal.

14. The system of claim 11, wherein the one or more hardware processors are further configured to:

perform a first correction of the audio and video synchronization based on the difference being less than a synchronization threshold; and perform a different second correction of the audio and video synchronization based on the difference being greater than the synchronization threshold.

15. The system of claim 11, wherein the one or more hardware processors are further configured to:

synchronize the playback of the video stream and the audio stream according to the difference.

16. The system of claim 15, wherein synchronizing the playback comprises:

discarding playback of one or more video frames from the plurality of video frames based on the difference indicating that the playback of the video stream is behind the playback of the audio stream; and duplicating playback of one or more video frames from the plurality of video frames based on the difference indicating that the playback of the video stream is ahead of the playback of the audio stream.

17. The system of claim 11, wherein the unique frame identifier of each video frame is encoded as part of image data of that video frame.

18. The system of claim 11, wherein the one or more hardware processors are further configured to:

present the difference as diagnostic data on a user interface.

19. The system of claim 11, wherein the one or more hardware processors are further configured to:

present the communication by rendering the plurality of video frames and playing back the audio signal as the video stream and the audio stream are decoded.

20. A non-transitory computer-readable medium storing program instructions that, when executed by one or more hardware processors of a communication device, cause the communication device to perform operations comprising:

receiving a video stream and an audio stream of a communication with a synchronization signal;

decoding a plurality of video frames and a unique frame identifier for each video frame of the plurality of video frames from the video stream;

decoding an audio signal from the audio stream;

detecting the unique frame identifier of a particular video frame that is played back at a same time at which the audio signal satisfies a threshold; and measuring a synchronization offset between playback of the video stream and the audio stream based on a difference between the unique frame identifier of the particular video frame and the unique frame identifier of a different video frame that is identified in the synchronization signal.

* * * * *